No. 779,191. PATENTED JAN. 3, 1905.
W. J. TRETCH.
TESTING MACHINE OR SCALE.
APPLICATION FILED MAY 10, 1904.

3 SHEETS—SHEET 1.

Witnesses
P. F. Nagle.
L. Douville.

Inventor
William J. Tretch.
By Diedersheim & Fairbanks
Attorneys

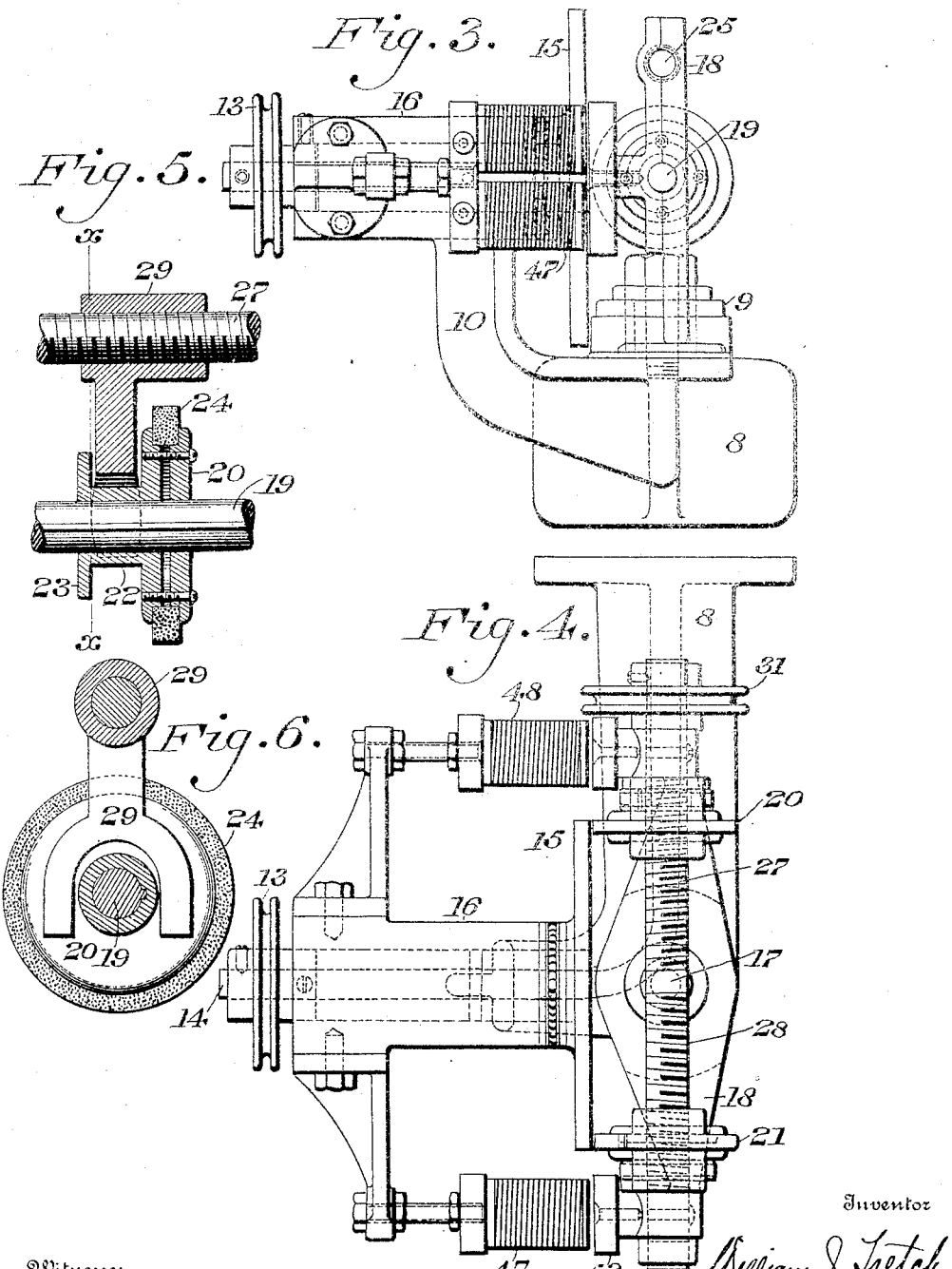

No. 779,191. PATENTED JAN. 3, 1905.
W. J. TRETCH.
TESTING MACHINE OR SCALE.
APPLICATION FILED MAY 10, 1904.
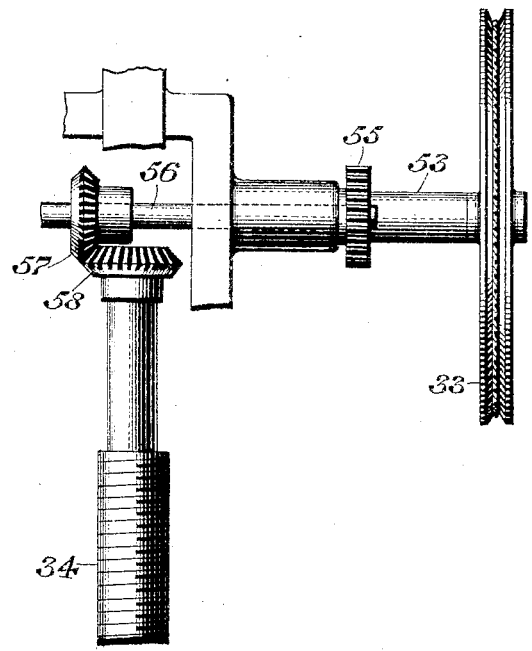
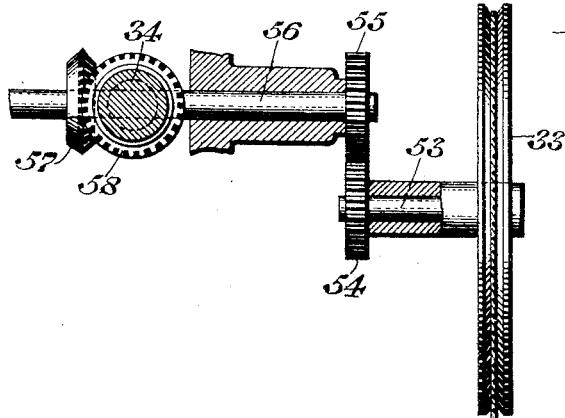

No. 779,191.

Patented January 3, 1905.

UNITED STATES PATENT OFFICE.

WILLIAM J. TRETCH, OF PHILADELPHIA, PENNSYLVANIA, ASSIGNOR TO FREDERICK A. RIEHLE, OF PHILADELPHIA, PENNSYLVANIA.

TESTING MACHINE OR SCALE.

SPECIFICATION forming part of Letters Patent No. 779,191, dated January 3, 1905.

Application filed May 10, 1904. Serial No. 207,304.

*To all whom it may concern:*

Be it known that I, WILLIAM J. TRETCH, a citizen of the United States, residing in the city and county of Philadelphia, State of Pennsylvania, have invented a new and useful Improvement in Testing Machines or Scales, of which the following is a specification.

My invention relates to testing machines or scales in which it is desired to move a poise by mechanism governed by the resistance or weight of the article to be tested or weighed.

It consists of means for automatically moving the poise in either direction and for varying the speed of such movement. It provides an electric connection independent of the scale beam or frame for actuating the device and by which the frictional contacts are held out of operation except when the poise is being moved.

It further consists of novel features of construction, all as will be hereinafter fully set forth.

Figure 1:
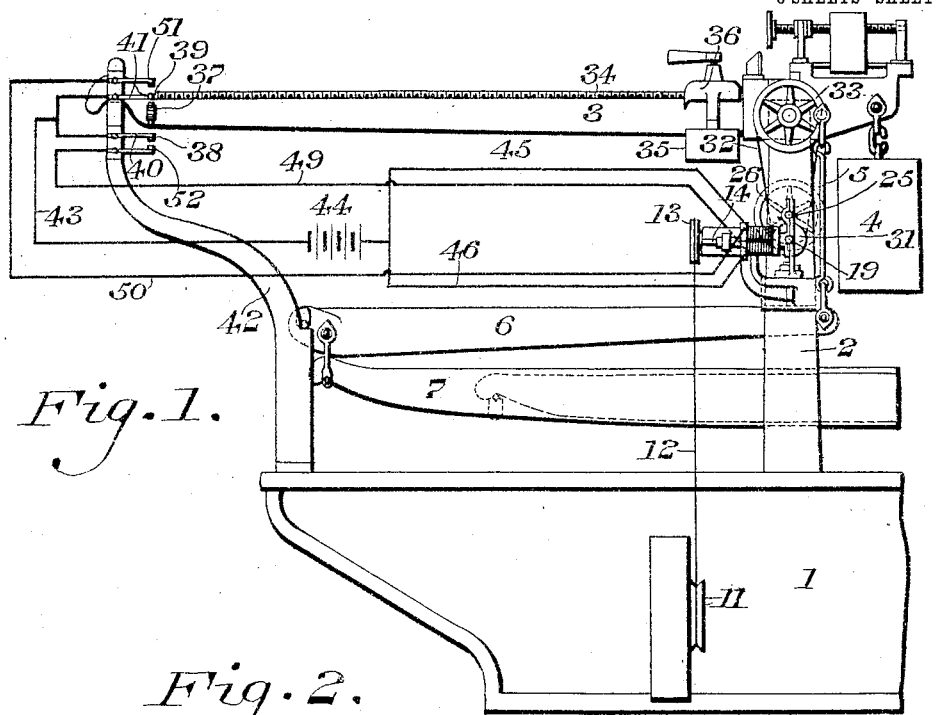
Figure 2:
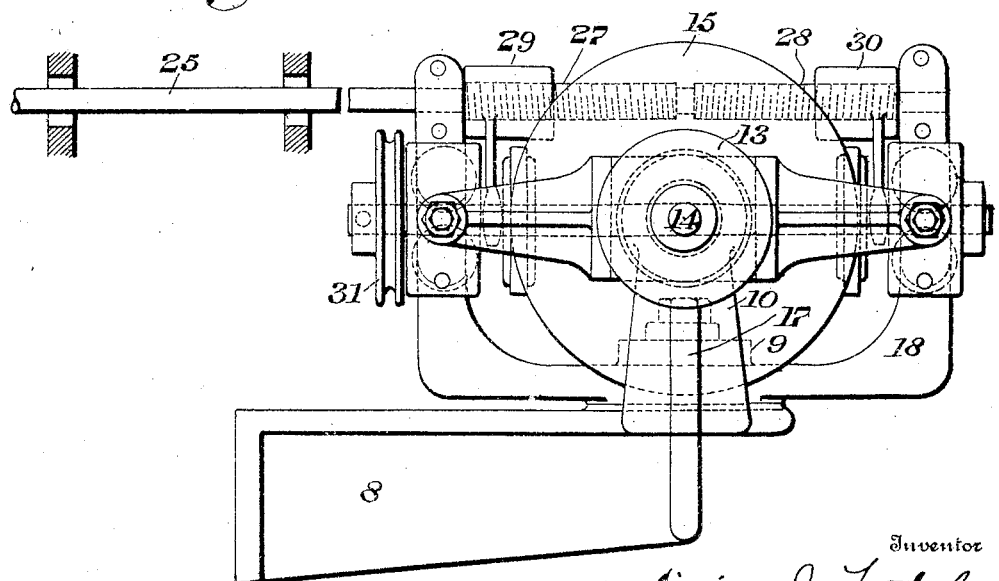

Figure 1 represents in front elevation so much of a testing machine or scale as is necessary to show the operation of my device. Figs. 2 and 3 represent in end and side elevation, respectively, and on an enlarged scale the frictional portion of the device. Fig. 4 is a top plan view of the same. Fig. 5 represents in vertical section and on a still more enlarged scale one of the friction-wheels and connected parts. Fig. 6 is a vertical section through line *x x*, Fig. 5. Fig. 7 represents a plan view of a portion of the device, showing means for rotating the lead-screw. Fig. 8 represents a side elevation thereof, showing a portion in section.

Similar numerals of reference indicate corresponding parts in the figures.

Referring to the drawings, 1 designates a portion of the frame of a testing-machine, from which rises a standard 2, on which the beam 3 is balanced. As shown, the beam 3 carries at its shorter end a weight 4 and supports a series of links 5, 6, and 7, forming part of the connection between the beam 3 and the grip device. (Not shown.) Projecting laterally from the standard 2 is a bracket 8, on which is mounted a block 9 and an upright 10.

11 designates a sheave-wheel mounted on the frame 1 of the machine and connected with a pulley-shaft, (not shown,) so as to be in continuous rotation when the machine is in use. A belt 12 leads from the wheel 11 to a similar sheave-wheel 13, mounted on the shaft 14, having a bearing in the upright 10. At the other end of the shaft 14 is a disk 15, shown as supported at the end of the sleeve 16 on the upright 10 by a ball-race. On the block 9 is mounted, by means of a pivot 17, a yoke 18, forming bearings for a shaft 19, on which are mounted friction-disks 20 and 21. As clearly shown in Fig. 5, the disks are provided with neck portions 22 and flanges 23. They may also be provided with annular friction-rings 24. The disks 20 and 21 are adapted to free longitudinal movement on the shaft 19, which is provided with a spline to prevent their rotation thereon. Also mounted in the yoke 18 is a rod 25, having at its free end a hand-wheel 26 and provided intermediate the arms of the yoke with right and left threaded screw portions 27 and 28, on which are mounted forks 29 and 30. The lower bifurcate ends of the forks 29 and 30 engage with the necks 22 of the disks 20 and 21, respectively. At the end of the shaft 19 is a sheave-wheel or pulley 31, which is connected by a belt 32 to a similar pulley 33, conveniently mounted adjacent the axis of rotation of the scale-beam 3. Connected with the pulley 33 by means of a gear (not shown) is a lead-screw 34, which extends substantially the length of the scale-beam 3 and carries a poise 35, provided with a nut portion 36, which engages with the screw and moves thereon. At the free end of the beam 3 is a block 37, adapted to contact alternatively with buttons 38 and 39, which are mounted on spring-arms 40 and 41, respectively, the arms being attached to a bracket 42, shown as supported on the frame 1. The buttons 38 and 39 are both connected by a wire 43 to a battery 44, from which lead branch wires 45 46 to the poles of magnets 47 and 48, respectively. From the opposite poles of these magnets return-wires 49 and 50 lead to buttons 51 and 52, supported by and insulated from a bracket 42 and slightly separated from the buttons 37 and 38, as above described. It is of course understood that the circuit is properly insulated from the said frame and said scale-beam.

In Figs. 7 and 8 I have shown the communication between the sheave 33 and the lead-screw 34, it being seen that the said sheave 33 is mounted upon the shaft 53, which carries thereon a gear 54, which meshes with the gear 55, which latter is directly above the gear on the shaft 53, and said gear 55 is mounted upon a shaft 56, which is suitably supported above said shaft 53 and in the center line of the lead-screw 34, said shaft 56 also carrying the miter 57, which meshes with the miter 58, attached to the lead-screw 34, it being further apparent that the speed of movement of the poise can be varied during the operation of the machine by the rotation of the hand-wheel 26, so that the poise can be run up rapidly to the approximate strength of the material or weight and also operated slowly in either direction, securing speed with great ultimate accuracy.

The operation is as follows: The specimen to be tested or the article to be weighed is placed in operative relation with the scale-beam 3. For convenience I will describe the operation of the device as applied to a testing-machine. It is of course understood that the poise on the scale-beam 3 is to indicate the load that is placed upon the article or specimen to be tested and that the mechanism herein described is for the purpose of automatically operating the poise in either direction on the beam as the load varies. The specimen having been placed in proper relation with the scale-beam and a load applied thereto, it will of course be apparent that the free end of the scale-beam will be raised or elevated, since before any load is applied to the specimen the scale-beam is in equilibrium and the free end thereof is midway between the contact-points, as will be hereinafter described. As the free end of the scale-beam 3 is raised it will cause the block 37 to contact with the buttons 39 and force the latter into contact with the button 51. This closes the electric circuit, the current flowing through branch 46, magnet 47, and return-wire 50, which energizes the magnet 47 and attracts the armature 52 toward said magnet 47, as will be understood from Fig. 4, the effect of which will be to bring the periphery of the disk 21 into contact with the rotating disk 15, which, as before described, is always in rotation during the operation of the machine. The motion of the disk 21 will be communicated, through the shaft 19, pulley 31, which is on said shaft 19, through belt 32, pulley 33, to the shaft 53, on which is mounted the gear 54, which meshes with the gear 55, carried on the shaft 56, upon which is carried the miter 57, which is in mesh with the miter 58, which is fastened to the screw 34 of the scale-beam, which is thus rotated and acts to run the poise 35 toward the left as seen in Fig. 1—that is, toward the free end of the scale-beam 3. When the poise has reached such a point on the beam as to balance the same with respect to the load, the free end of the beam will fall to the point between the contact-points, the contact hereinbefore described will be broken, and the poise will remain in that position until the load is changed—as, for example, if a further load is applied to the test specimen the free end of the beam will again be raised and the operation as previously described will again take place. It will be evident that the poise during the test is moving continuously, as the load on the specimen is usually increased continuously, or if for any reason there is a decrease of the load on the test specimen the poise is moved back automatically on the scale-beam by a reverse of the operation just described—that is to say, the free end of the scale-beam will fall, which causes a contact of the block 37 with the button 38, which will contact with the button 52, thus closing the circuit, in which case the current will flow through the branch 45, magnet 48, and return-wire 49, which energizes the magnet 48 and causes the periphery of the disk 20 to contact with the rotating disk 15, and as this contact is on the opposite side of the disk the rotation or operation of the parts will be in the opposite direction from that previously described, the mechanism, however, being the same as before described and operating to cause the poise 35 to move to the right as seen in Fig. 1 of the drawings. From the above it will be understood that as the load is increased or diminished the poise is automatically operated and that when the load is entirely removed or the specimen breaks the poise is immediately operated to return to zero. In order to ascertain the loads that have been placed upon the test specimen, it is necessary that a sight of the poise on the scale-beam be taken as same moves thereon and a record thereof retained, as the object of the present invention is the automatic movement of the poise depending upon the load on the specimen.

It is evident that by means of the hand-wheel 26 and the right and left screw-threaded portions 27 and 28 the forks 29 and 30 may be moved toward or away from each other and carry with them the disks 20 and 21, thereby decreasing or increasing the distances of these disks from the center of the revolving disk 15, so that the speed of movement of the disks 20 and 21, and hence of the poise 35, may be varied as desired.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In a scale, a frame, a beam, a poise on said beam, a continuously-rotating disk, a plurality of disks adapted to be brought alternatively into operative relation with said first-named disk, mechanism for automatically moving said poise in either direction on said beam when said disks are brought into operative relation, and an electric circuit controlling the operation of said moving mechanism, said circuit being insulated from said frame and said beam.

2. In a scale, a frame, a beam, a poise on said beam, a continuously-rotating disk, a plurality of disks adapted to be brought alternatively into operative relation with said first-named disk, mechanism for automatically moving said poise in either direction on said beam when said disks are brought into operative relation, and a plurality of electric circuits adapted to control said moving mechanism.

3. In a scale, a frame, a beam, a poise on said beam, mechanism for automatically moving said poise in either direction on said beam, a plurality of electric circuits adapted to control said moving mechanism and means for varying the rate of movement of said poise.

4. In a scale, a frame, a beam, a poise on said beam, a continuously-rotating disk, a plurality of disks adapted to be brought alternatively into operative relation with said first-named disk, mechanism for automatically moving said poise in either direction on said beam when said disks are brought into operative relation, a plurality of electric circuits adapted to control said moving mechanism, and means movable with said beam for alternatively closing said circuits.

5. In a scale, a beam, a poise on said beam, a continuously-rotating disk, a plurality of disks adapted to be brought alternatively into operative relation with said first-named disk, mechanism actuated by said disks for moving said poise in either direction on said beam, and means controlled by said beam for alternatively bringing one of said second-named disks into such operative relation.

6. In a scale, a beam, a poise on said beam, a continuously-rotating disk, a plurality of disks adapted to be brought alternatively into operative relation with said first-named disk, mechanism adapted to be actuated by said disks to move said poise in either direction, means movable with said beam for alternatively bringing one of said second-named disks into such operative relation, and means for varying the rate of movement of said disks.

7. In a scale, a beam, a poise on said beam, a continuously-rotating disk, a plurality of disks adapted to be brought alternatively into operative relation with said first-named disk, mechanism actuated by said disks to move said poise in either direction on said beam, means movable with the said beam for alternatively bringing one of said second-named disks into such operative relation, means for varying the rate of movement of said disks, a plurality of electric circuits adapted to bring said last-named disk alternatively into such operative relation and means movable with said beam for alternatively closing said circuits.

8. In a scale, a poise-actuating device including a continuously-rotating disk, a shaft pivotally mounted adjacent said disk, a plurality of disks on said shaft, mechanism connecting said shaft with said poise for moving the same in either direction, a plurality of supports adjacent said first-named disk, magnets and armatures coöperatively arranged between said supports and said pivoted shaft, a plurality of electric circuits each connected with one of said magnets, and means movable with said beam for alternatively closing said circuits.

9. In a scale, a poise-actuating device including a continuously-rotating disk, a shaft pivotally mounted adjacent said disk, a plurality of disks on said shaft, mechanism connecting said shaft with said poise for moving the same in either direction, a plurality of supports adjacent said first-named disk, magnets and armatures common to said supports and said pivoted shaft, a plurality of electric circuits each connected with one of said magnets, means movable with said beam for alternatively closing said circuits and means for varying the distances of said second-named disks from the center of said first-named disk.

10. In a scale, a poise-actuating device including a continuously-rotating disk, a shaft pivotally mounted adjacent said disk, a plurality of disks longitudinally movable on and rotatably connected with said shaft, mechanism connecting said shaft with said poise for moving the same in either direction, a plurality of supports adjacent said first-named disk, magnets and armatures common to said supports and said pivoted shaft, means movable with the scale-beam for alternatively energizing said magnets, a right-and-left screw adjacent said pivoted shaft and forks running on said screw and engaging said second-named disks for simultaneously varying their distances from the center of said first-named disk.

11. In a scale, a poise-actuating device automatically operative to move the poise in either direction on the beam and adjustable means for varying the rate of movement of the same.

12. In a scale, a poise-actuating device automatically operative to move the poise in either direction on the beam, adjustable means for varying the rate of movement of the same and means which can be actuated during the operation of the machine to adjust the said adjustable means to vary the movement of the poise.

WILLIAM J. TRETCH.

Witnesses:
JOHN A. WIEDERSHEIM,
WM. CANER WIEDERSEIM.